United States Patent [19]

Shiozawa

[11] 4,324,467
[45] Apr. 13, 1982

[54] PROGRAMED EXPOSURE CONTROL DEVICE

[75] Inventor: Kazuo Shiozawa, Tokyo, Japan

[73] Assignee: Konishiroku Photo Industry Co., Ltd., Tokyo, Japan

[21] Appl. No.: 216,664

[22] Filed: Dec. 15, 1980

[30] Foreign Application Priority Data

Dec. 18, 1979 [JP] Japan .................. 54-163540
Dec. 18, 1979 [JP] Japan .................. 54-163541
Dec. 18, 1979 [JP] Japan .................. 54-163542

[51] Int. Cl.³ .......................................... G03B 7/097
[52] U.S. Cl. ................................ 354/38; 354/23 D
[58] Field of Search ............ 354/23 D, 29, 30, 36-38, 354/48-51

[56] References Cited

U.S. PATENT DOCUMENTS 3,896,460 7/1975 Sahara ........................... 354/51
3,928,858 12/1975 Sakurada et al. ............... 354/50 X
4,213,682 7/1980 Yamada ......................... 354/38 X

FOREIGN PATENT DOCUMENTS

1043802 11/1958 Fed. Rep. of Germany ........ 354/59

*Primary Examiner*—L. T. Hix
*Assistant Examiner*—William B. Perkey
*Attorney, Agent, or Firm*—James E. Nilles

[57] ABSTRACT

A programed exposure control device for changeable lens type camera of the type in which the object brightness information is corrected in accordance with other exposure informations including the open F value and the corrected brightness information is ranked to permit the determination of the aperture value in accordance with the rank in a stepped manner and the determination of the shutter speed in accordance with the rank and the brightness information. Said device is further including at least one comparison circuit to compare whether the open F value is greater than the smallest aperture value corresponding to the rank or not. Said device is so constructed as to provide, when the open F value of the lens to be used is greater than the smallest aperture value corresponding to the rank, a shutter speed signal representing a shutter time length which is longer than the shutter time length corresponding to the rank which provides the open-side aperture value closest to the open F value of the lens and to the brightness information, by a time length corresponding to a predetermined light value. The aperture is beforehand set at a constant aperture value which can substantially eliminate the influence of difference of the open F value of the lens. The aperture value for the actual photographing is determined in accordance with the TTL light measurement information at the first-mentioned aperture value, while the shutter speed is determined in accordance with the thus determined aperture value.

3 Claims, 7 Drawing Figures

PROGRAMED EXPOSURE CONTROL DEVICE

BACKGROUND OF THE INVENTION

1. Field of the Invention

The present invention relates to an improvement in a programed exposure control device.

2. Description of the Prior Art

Such a programed exposure control device for lens shutter has been known as having a shutter which acts also as an aperture in such a way that, when the object is bright, the shutter blades are closed before they are moved to full opening position. For the cameras of the type including other types than the lens shutter, as well as the lens shutter, there are several types of programed exposure control device. For instance, a first type device is arranged such that the aperture opening and the shutter speed are determined simultaneously in accordance with the brightness of the object. Also, a second type device is arranged such that the aperture opening is selected in accordance with the brightness of the object and then the shutter speed is determined in accordance with the selected aperture opening and the brightness of the object.

Excepting the programed lens shutter, in the above-mentioned exposure control device of the first type, the aperture opening and the shutter speed are determined simultaneously with each other. It is, however, extremely difficult to set the aperture opening and the shutter speed precisely in accordance with the program. This not only complicates the construction of the device but also poses a problem that a considerably long time is required for the setting of the aperture opening and shutter speed. In the device of the second type, at first the aperture opening is set and then the shutter speed is determined on the basis of the aperture opening and the brightness of the object, so that the setting of the aperture opening does not necessitate such a high precision and, therefore, it is possible to promptly determine the aperture opening. However, since the shutter speed is determined after the setting of the aperture opening, the whole process of determination of the exposure condition requires a considerably long time. In addition, a considerably complicated mechanism is required for the setting of the aperture opening in accordance with the brightness of the object.

In order to eliminate the above-described problems in the programed exposure control device not limited to the lens shutter, the present inventor has already proposed a programed exposure control device in which the object brightness information, with or without correction by film sensitivity or other exposure information, is suitably ranked to permit determination of the aperture opening fixed for each rank, and the shutter speed is determined in accordance with the rank and the object brightness information.

In this exposure control device, the aperture opening is determined in a stepped manner according to the rank of the object brightness information, so that the aperture setting device can have a simplified and strong construction while achieving a prompt setting of the aperture opening. The aperture opening is set in a stepped manner in accordance with the rank, so that, once the ranking of the object brightness information is made, it is possible to determine the aperture opening and the shutter speed simultaneously. In consequence, the exposure condition is set in quite a short period of time to avoid loss of the chance of shooting.

When the above-described invention is applied to a changeable-lens type camera, it is necessary to correct the object brightness information in accordance with the F value. When the brightness information thus corrected is ranked, it is considerable that the aperture opening corresponding to the rank is greater than the maximum aperture opening, i.e. F value, of the new lens. In this case, it is not possible to set the aperture in conformity with the ranking of the brightness information. This problem can be overcome by changing the ranking in such a manner that the aperture opening takes the same value as the F value of full opening of the new lens or slightly smaller than the F value. This solution, however, is inconvenient in that the number of steps of the ranks available is reduced and, in addition, the determination of the shutter speed is made only at extremely late part in the ranking. This may cause the photograph to be blurred by a slight movement of hand during taking the picture.

In the TTL open light measuring program type exposure control device for the conventional exchangeable lens type camera, the TTL light information is affected by the open F value of the lens. The TTL light information, therefore, is corrected by means of the open F value information. In consequence, the exposure control device is complicated and it becomes necessary to provide the lens unit with a member for the introduction of the open F value. This may cause some failures in the handling of the camera.

SUMMARY OF THE INVENTION

Under these circumstances, the present invention provides a programed exposure control device for exchangeable lens type camera of the type in which the object brightness information is corrected in accordance with other exposure information including the open F value of the lens and the corrected brightness information is ranked, and the aperture opening is determined in stepped manner in accordance with the ranks of the information, while the shutter speed is determined in accordance with the rank and the brightness information, characterized in that, when the open F value of the lens to be used is greater than the smallest aperture value corresponding to the ranks, the shutter speed is determined to be longer than the shutter speed corresponding to the rank and brightness information which provides the aperture opening closest to the open F value of the lens, by a length corresponding to a predetermined light value.

Namely, in the programed exposure control device of the invention, even when the open F value of the lens is greater than the maximum aperture corresponding to the rank, the ranking information which provides the aperture opening closest to the open F value is utilized. At the same time, the shutter speed is determined to be longer than the shutter speed corresponding to this rank and brightness information by a time length corresponding to a predetermined light value, so as to compensate for the aperture value corresponding to this rank and the open F value which is the actual aperture opening.

It is, therefore, possible to prevent the reduction of number of actually usable ranks, and the shutter speed is determined to be fast as compared with the case in which the rank is deviated by one step in the smaller opening side. In consequence, the unfavourable blur due to movement of hand is avoided and the photographing is made under optimum exposure condition.

Another object of the invention is to provide a programed exposure control device of the type in which the object brightness information obtained through a TTL light measurement is corrected in accordance with other exposure information including the open F value of the lens, and the brightness information thus obtained is ranked, and the aperture opening is determined in stepped manner in accordance with the ranks of the information, while the shutter speed is determined in accordance with the rank and on the basis of the brightness information, characterized in that, when the aperture opening given in accordance with the ranking is greater than that of the open F value of the lens to be used, the actual aperture setting is not made but the shutter speed is determined in accordance with the brightness information which has not been corrected by the open F value of the lens.

Namely, in the programed exposure control device of the invention, when the aperture opening given by the ranking is greater than the open F value of the lens, the open F value of the lens directly determines the aperture opening during actual photographing. In this case, the open F value of the lens corresponds to one of the ranks of the ranking so that the reduction of the number of ranks available is reduced. At the same time, the shutter speed is determined to be faster or higher than that obtained in accordance with shifted ranking.

Still another object of the invention is to overcome the aforementioned problems by arranging such that the aperture opening is set at a constant value which substantially eliminates the influence of difference of the open F value of the lens unit, and the aperture opening and the corresponding shutter speed are determined in accordance with the TTL light measuring information at the set aperture opening.

Other objects and advantageous features of the invention will become clear from the following description of the preferred embodiments taken in conjunction with the accompanying drawings.

BRIEF DESCRIPTION OF THE PREFERRED EMBODMENTS

DESCRIPTION OF THE PREFERRED EMBODIMENTS

Figure 1:
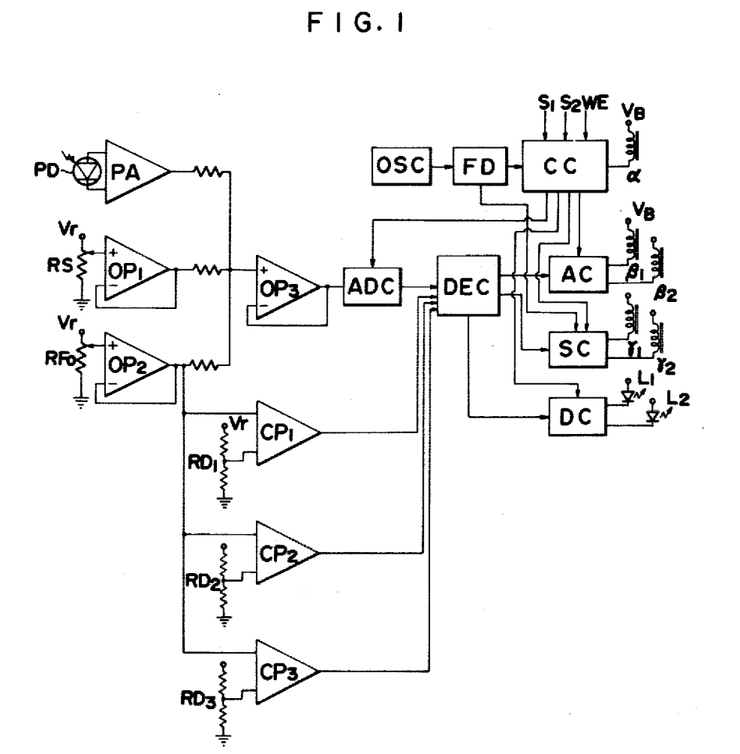
FIG. 1 is a block circuit diagram of a programed exposure control device in accordance with the invention.

Referring to FIG. 1, PA represents a light measuring circuit having a light-receiving element PD, while RS represents a slide resistance for setting the film sensitivity. $RF_o$ is the slide resistance for setting the open F value of the lens. Symbols $OP_1$ to $OP_3$ represent, respectively, operation amplifiers. The object brightness information derived from the light measuring circuit PA, film sensitivity output from the operation amplifier $OP_1$ and the lens open F value information derived from the operation amplifier $OP_2$ are delivered as analog informations to the operation amplifier $OP_3$. The operation amplifier $OP_3$ makes a suitable arithmetic operation to correct the object brightness information and delivers the corrected information as an analog information to an analog-digital converter circuit ADC. The converter ADC converts the analog signal into digital brightness information which is delivered to a decoder circuit DEC. The decoder circuit DEC effects the ranking of the digital brightness information. In the illustrated embodiment, the information is ranked into three ranks of high brightness, medium brightness and low brightness. The decoder DEC sends an aperture signal corresponding to the rank to an aperture determination circuit AC, and delivers also a display signal similar to the aperture signal to the display control signal DC. Also, the decoder DEC delivers to a shutter control circuit SC a shutter speed signal corresponding to the rank and the brightness information or a shutter speed signal which is longer by a time length corresponding to a predetermined light value than the shutter speed corresponding to the rank and brightness information.

Symbols $CP_1$ to $CP_3$ represent comparator circuits which compare the lens open F value information from the operation amplifier $OP_2$ with the informations set in resistance potential dividers $RD_1$ to $RD_3$. When these set informations are exceeded by the lens opening F value information, these comparators deliver signals to the decoder circuit DEC. The decoder circuit DEC provides, in accordance with the signal coming from the comparator circuit $CP_1$, a shutter speed signal corresponding to the rank and the brightness information or a shutter speed signal which is longer than the above-mentioned shutter speed signal by a time length corresponding to a predetermined light value.

It is assumed here that the resistance potential dividers $RD_1$-$RD_3$ of the comparator circuits $CP_1$-$CP_3$ are so selected that the ranking of the brightness information made by the decoder circuit DEC is made into the three ranks of high brightness, medium brightness and low brightness, and that the aperture values are set to be 11, 5.6 and 2.8, respectively, when the brightness information is ranked at high, medium and low, respectively. It is also assumed that 5 (five) kinds of changeable lens units having open F values of 2.0, 2.8, 3.5, 4.0 and 8.0 are available. Provided that the resistance potential dividers $RD_1$-$RD_3$ are selected such that the $RD_1$ provides a value between 2.8 and 3.5, $RD_2$ provides a value between 3.5 and 4.0 and the $RD_3$ provides a value between 5.6 and 8.0, the combinations of the lens open F values and the output signals of comparator circuits $CP_1$-$CP_3$ are available as shown in the following Table 1.

TABLE 1

| Open F value | $CP_1$ | $CP_2$ | $CP_3$ |
|---|---|---|---|
| 2.0 | 0 | 0 | 0 |
| 2.8 | 0 | 0 | 0 |
| 3.5 | 1 | 0 | 0 |
| 4.0 | 1 | 1 | 0 |

TABLE 1-continued

| Open F value | $CP_1$ | $CP_2$ | $CP_3$ |
|---|---|---|---|
| 8.0 | 1 | 1 | 1 |

Note:
"1" means that there is a signal output, while "0" means that there is no signal output.

The decoder circuit DEC delivers, in accordance with these signals, a shutter speed signal corresponding to the rank and the brightness information, to the shutter control circuit SC, when the open F value of the lens used is 2.8 which is equal to the greatest aperture opening obtained in the ranking, or when the F value is 2.0 smaller than 2.8. However, when the open F value of the lens falls between 3.5 and 4.0 which is greater than the greatest opening (2.8) obtained in accordance with the ranking, the decoder circuit DEC delivers to the shutter control signal SC a shutter speed signal which is longer than the shutter speed signal corresponding to the rank and the brightness information corresponding to a predetermined light value which is, for example, 0.5 LV and 1.0 LV for the open F values of 3.5 and 4.0.

When the ranking is made to provide an actual aperture value of 5.6 or 11 for the lenses having open F values of 3.5 and 4.0, the shutter speed signal corresponding to these ranks and brightness information is delivered to the shutter control circuit SC. Also, when the open F value of the lens is 8.0 which is greater than 2.8 which is the greatest aperture opening determined in accordance with the ranking, the shutter speed signal corresponding to the rank and the brightness information is given to the shutter control circuit SC provided that the ranking is made to select the rank which provides the actual aperture value of 11. However, if this condition is not met, the shutter control circuit SC receives a shutter speed signal which is longer than the shutter speed corresponding to the rank and light information which provides the aperture value (5.6) closest to the open F value of the lens, than a time length corresponding to a predetermined light value, e.g. 1 LV.

The decoder circuit DEC having the described function can easily be formed by a decoder circuit which relates to lens open F values 2.0 and 2.8, a decoder circuit which relates to the lens opening F value of 3.5, a decoder circuit which relates to a lens open F value of 4.0, a decoder circuit which relates to the lens opening F value of 8.0 and a switching circuit which selectively switches these decoder circuits in accordance with the signals mentioned in Table 1 above.

In such a case that the determination of the same shutter speed for the open aperture F values 3.5 and 4.0 does not matter, the aforementioned comparator circuit $CP_2$ can be eliminated. Also, the comparator circuit $CP_3$ may be omitted if the lens unit having open F value of 8.0 is not used. By such eliminations, the construction of decoder circuit DEC is needless to say simplified.

The aperture determination circuit AC maintains the solenoids $\beta_1$ and $\beta_2$ inoperative, when it receives an aperture signal of high brightness rank. When the aperture signal received is of medium brightness rank, the aperture determination circuit AC permits the solenoid $\beta_1$ to operate while keeping the solenoid $\beta_2$ inoperative. When the signal received is of low brightness rank, the aperture determination circuit AC acts to permit the solenoid $\beta_2$ to operate while keeping the solenoid $\beta_1$ inoperative. Thus, a constant aperture value is obtained for each rank by the aperture setting device shown in FIG. 2.

Figure 2:
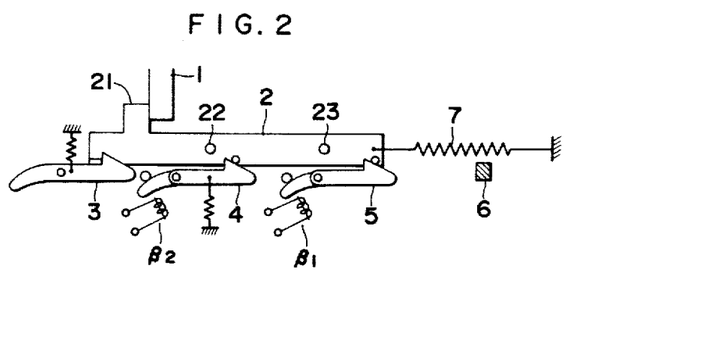
FIG. 2 is a schematic side elevational view of an aperture setting device.

Referring to FIG. 2, a reference numeral 1 denotes an aperture blade driving lever mounted in a changeable lens barrel unit, while a reference numeral 2 denotes an aperture setting bar provided on the camera body. A reference numeral 3 designates a charge retainer hook of the aperture setting bar 2. Numerals 4 and 5 denote, respectively, a hook corresponding to the greatest aperture opening and medium aperture opening, while a reference numeral 6 designates a stopper member for the maximum aperture value. As the solenoid $\beta_1$ is energized, a counterclockwise rotation is imparted to the hook 4 for the greatest aperture opening while, when the solenoid $\alpha_1$ is energized, the charge retaining hook 3 is rotated in the counter-clockwise direction overcoming the spring so as to be disengaged from the aperture setting bar 2. The aperture setting bar 2 disengaged from the hook 3 is then moved to the right by the pulling force exerted by a spring 7. This in turn causes the hook 4 to be rotated in the counter-clockwise direction into engagement with an open-side aperture value projection 22 provided on the aperture setting bar 2. In consequence, the aperture set lever 2 is retained at the position where it gives the open-side aperture value. The aperture blade driving lever 1 is always biased by a spring (not shown) to make a continuous contact with the operation arm 21 of the aperture setting bar 2 in the state that the lens unit is mounted on the camera body, so that it perfectly cooperates with the aperture setting bar to change the aperture opening.

More specifically, referring to FIG. 2, a charge retainer hook 3 is rotated in the clockwise direction overcoming the force of the spring and is disengaged from the aperture setting lever 2. In consequence, the aperture setting lever 2 is moved to the right as it is pulled by the spring 7, to enlarge the aperture opening by displacing the aperture blade driving lever 1 which is always kept in contact with the operation arm 21 of the aperture setting lever 2 by a spring which is not shown.

Since both of the solenoids $\beta_1$ and $\beta_2$ are kept inoperative when the brightness is of high brightness rank, the aperture setting lever 2 makes a stop upon contact with the final aperture position stopping member 6. In this state, obtained is a constant and definite aperture value of, for example, 11. In the event that the brightness is of the medium rank, the solenoid $\beta_1$ operates while the solenoid $\beta_2$ does not operate, so that the medium aperture retainer hook 5 is rotated counter-clockwise as a result of the rightward movement of the setting lever 2 to take a position where it engages the medium aperture position projection 23 of the aperture setting lever 2. Therefore, the aperture setting lever 2 is stopped by the engagement between the medium aperture position projection 23 and the medium aperture retainer hook 5, so that an accurate aperture value of, for example, 5.6 is obtained. In case that the brightness is ranked low, the solenoid $\beta_2$ is actuated so that the aperture setting lever 2 is stopped as the open aperture position projection 22 engages the open aperture retainer hook, thereby to provide a fixed and definite aperture value, e.g. 2.8.

Thus, the aperture opening is determined and set in a stepped manner at a constant level in accordance with the rank due to the operation of the aperture determination circuit AC and the aperture setting device, the decoder circuit DEC can deliver to the shutter control circuit SC the signal representing the shutter speed corresponding to the rank and the brightness information of the signal giving an exposure time length longer than that of the above-mentioned shutter speed by an amount corresponding to a predetermined light value, before the completion of the setting of the aperture opening.

The shutter control circuit SC provides, in accordance with the shutter speed signal coming from the decoder circuit DEC, an information concerning the optimum shutter speed corresponding to the actual aperture and the object brightness. The determination of the shutter speed is made in such a manner that the shutter control circuit SC actuates the solenoid $\gamma_1$ for the leading screen in accordance with the signal from the main control circuit CC to make the leading screen run. Then, after elapse of a time length coinciding with the time length of the shutter speed signal, the solenoid $\gamma_2$ for the trailing screen is energized to drive the trailing screen. The counting of the time of determination of the interval between the running of the leading screen and the trailing screen is made from the instant at which the solenoid $\gamma_1$ is energized, by means of a counter which counts the time signal derived a frequency dividing circuit which makes a frequency division of the signal obtained from an oscillation circuit OSC. The shutter control circuit SC having the described function is constituted by a counter circuit and a digital comparator circuit.

Assuming that the ranking is made into three ranks of low brightness, medium brightness and high brightness corresponding to aperture set values of 2.8, 5.6 and 11, and that the open F values, i.e. $F_o$, of the changeable lens units are below 2.8 and 4.0, the setting of the aperture values and the shutter speed for the optimum exposure condition is made, for example, in a manner as shown in Table 2.

TABLE 2

| brightness information | | | aperture | | | shutter speed | |
|---|---|---|---|---|---|---|---|
| LV | 6 bit signal | | $\beta_1$ | $\beta_2$ | aperture value | $F_o \leq 2.8$ | $F_o = 4.0$ |
| 17 | 000000 | high | | | | 0.98 ms | 0.98 ms |
| ∫ | ∫ | bright- | 0 | 0 | 11 | ∫ | ∫ |
| 14 | 001100 | ness | | | | 7.81 | 7.81 |
| 13⅝ | 001101 | medium | | | | 2.44 | 2.44 |
| ∫ | ∫ | bright- | 0 | 1 | 5.6 | ∫ | ∫ |
| 11 | 011000 | ness | | | | 15.60 | 15.60 |
| 10⅝ | 011001 | low | | | | 4.88 | 9.77 |
| ∫ | ∫ | bright- | 1 | 0 | 2.8 | ∫ | ∫ |
| 8 | 100100 | ness | | | | 31.30 | 62.60 |

Note:
As to the solenoids $\beta_1$ and $\beta_2$, "0" and "1" represent, respectively, inoperative state and operative state.

In the low rank of brightness in the Table 2 above, the shutter time length at open F value 4.0 is longer than that of F value below 2.8 by a time length corresponding to a light value 1 LV.

As stated already, the shutter speed in the low brightness rank when a lens unit having an open F value of 3.5 should necessarily be different from the value appearing in the table at the column of $F_o = 4.0$. However, it is possible to make the photographing under more appropriate exposure condition than the photographing which is made at a shutter speed corresponding to the aperture value 2.8.

In order to make the invention understood more clearly, an explanation will be made hereinunder as to a series of photographing condition.

As the releasing operation is made, the light measuring switch (not shown) operates to put the light measuring circuit PA into operation and, at the same time, the signal $S_1$ is put into the main control circuit CC to make the latter operative.

Then, a release switch (not shown) is actuated to input a signal $S_2$ into the main control circuit CC. In consequence, the main control circuit CC delivers a start signal to the analog-digital converter circuit ADC, decoder circuit DEC and the shutter control circuit SC to make them operative. As a result, the analog-digital converter ADC starts to convert the analog brightness information from the operation amplifier $OP_3$ into digital brightness information and to send the latter to the decoder DEC. The decoder circuit DEC then makes the ranking of the digital brightness information and provides the aperture signal to the aperture determination circuit AC and a shutter speed signal to the shutter control circuit SC. As stated before, this shutter speed signal is a signal which provides the shutter speed corresponding to the ranking and the brightness information or a signal which provides a shutter opening time length longer that the above-mentioned shutter speed signal by an amount corresponding to a predetermined time length.

The main control circuit provides, at a timing which stabilizes the output from the decoder circuit DEC, set signals which are delivered to the analog-digital converter circuit ADC and the decoder circuit DEC to make the analog-digital converter circuit ADC and the decoder circuit DEC hold their output values. The main control circuit CC also delivers a signal to the aperture determination circuit to selectively energize and de-energize the solenoids $\beta_1$ and $\beta_2$ such that aperture values corresponding to the ranks may be obtained.

Subsequently, the main control circuit CC further actuates the solenoid $\alpha$ which controls the rise of the mirror and the release of the charge retainer hook 1 shown in FIG. 2, thereby to effect the rise of the mirror and the determination of the aperture value. The shutter control circuit SC receives a signal from the main control circuit CC at the timing of completion of rise of the mirror and the setting of the aperture value, and acts to make the leading and trailing screens to run to determine the shutter speed.

The display control circuit DC receives a signal from the main control circuit CC during the period between the commencement of operation of the main control circuit and the completion of setting of the aperture opening, and makes the display of the rank of the brightness by selectively driving light-emitting elements such that both elements $L_1$, $L_2$ are driven when the brightness is ranked at high rank, while only the element $L_1$ and $L_2$ are driven when the brightness is ranked at medium and low ranks, respectively.

It is thus possible to obtain a photographing under optimum condition even when the open F value of the lens is greater than the aperture value determined by the aperture value of the brightness information.

As the photographing operation is completed, the winding device which is not shown is actuated to winding or cocking of the film as well as charging of the mirror, aperture and shutter. In consequence, the main control circuit CC receives a signal WE, so that the main control circuit CC produces a reset signal which is delivered to the analog-digital converter circuit ADC and other circuits thereby to reset these circuits to complete a series of photographing operation. In this state, the exposure control device of the invention resumes completely the initial state.

The timing control of the main control circuit CC explained above is performed on the basis of a frequency dividing circuit FD. The main control circuit CC can have, for instance, a construction as shown in Japanese Patent Laid-open Publication No. 20,724/1979, particularly at FIG. 2.

In the described embodiment, the switching operation is made in accordance with analog information and the exposure control is made by a digital control. This form of control, however, is not exclusive. Namely, according to the invention, it is possible to effect the switching in accordance with the comparison of digital information and to effect the setting of the aperture value and determination of the shutter speed in accordance with the analog information.

Figure 3:
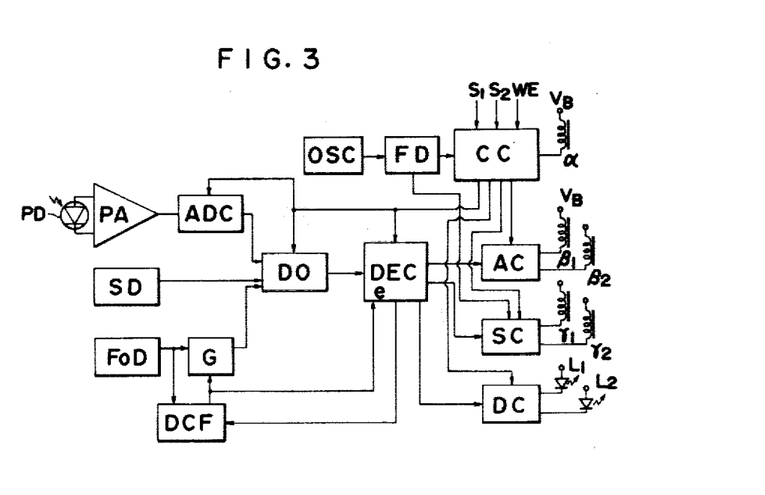
FIG. 3 is a block circuit diagram of a programed exposure control device constructed in accordance with another embodiment of the invention.

Referring now to FIG. 3, PA represents a light measuring circuit adapted to conduct a TTL light measurement by means of a light-receiving element PD, while ADC represents an analog-digital converter circuit for converting the analog information of the brightness of object into digital signal. A digital switch SD is provided for setting the sensitivity of the film. A digital operation unit DO is adapted to deliver a digital light value as a brightness information which is obtained by a suitable arithmetic operation and correction of the digital brightness information from analog-digital converter circuit ADC, digital film sensitivity information from the film sensitivity setting digital switch SD and the digital open F value information from the open F value setting digital switch FoD.

The signal appointing the aperture value is given also to another decoder circuit DCF. The decoder circuit DEC in this state is in the opening light measuring mode. The decoder circuit DEC can perform, in addition to the above-described opening light measuring operation, an operation of closing light measuring mode, as will be explained hereinunder.

In this embodiment, when the aperture value is determined in a stepped manner in accordance with the ranks of the brightness by the operation of the aperture determination circuit AC and the aperture setting device, the decoder circuit DEC delivers to the shutter control circuit SC a shutter speed signal in accordance with the light value, i.e. in accordance with the aperture value of 2.8 in case of the low brightness rank, 5.6 in case of the medium brightness rank and 11 in case of the high brightness rank, by the open light measuring mode, provided that the open F value of the lens is equal to or brighter than the greatest aperture opening given by the aperture setting device, i.e. 2.8, thereby to effect the setting of shutter speed at the optimum value corresponding to the rank, i.e. to the aperture value and the object brightness information. However, when the open F value of the lens is 3.5 or 4.0 while the ranking made by the decoder circuit DEC is made at the low brightness rank, it is not possible to actually obtain the aperture value of 2.8 but the actual aperture value is naturally limited to 3.5 or 4 which is the open F value peculiar to the lens unit. In this case, the shutter speed signal, which is delivered by the decoder circuit DEC in accordance with the light value corresponding to the aperture value of 2.8 to the shutter control circuit SC does not correctly correspond to the actual shutter speed. This problem is overcome by the invention as will be described hereinunder.

The decoder circuit DCF, upon receipt of the signal corresponding to the decoder circuit DEC, compares the signal from the decoder circuit DEC with the digital open F value information coming from the open F value digital switch FoD, to judge whether the aperture value corresponding to the rank is at the open side of the open F value of the lens or not. If the aperture value corresponding to the rank is at the opening side, the gate circuit G is actuated to interrupt the digital open F value information coming from the open F value digital switch FoD to prevent the same from coming into the digital operation unit DO. At the same time, the decoder DCF delivers a signal also to the decoder circuit DEC. The decoder circuit switches, upon receipt of this signal, the operation mode from the opening light measuring mode in which shutter speed signal in accordance with the light value corresponding to the rank is given to the aperture setting circuit AC to a closing light measuring mode in which the shutter speed signal independent of the rank, i.e. corresponding to the digital light value itself, is delivered to the shutter control circuit SC. In this closing light measuring mode, the states of output other than those for the shutter control circuit SC are identical to those of the opening light measuring mode.

Assuming here that the open F value of the lens unit is 3.5 and the digital light value obtained through the TTL light measurement is ranked by the decoder circuit DEC at the low brightness rank to permit the aperture determination circuit AC and the aperture setting device to provide the maximum opening aperture value of 2.8, the digital operation unit DO no more receives the digital opening F value information. In this state, the digital light value delivered by the digital operation unit DO to the decoder circuit DEC is the brightness information of the TTL light measurement which has not been subjected to the correction by the open F value of the lens. Namely, the aperture value is the light value of 3.5, i.e. the open F value of the lens unit, and the shutter speed signal corresponding to this light value is delivered to the shutter control circuit SC, so that the shutter speed is determined in accordance with the TTL light measurement effected at the aperture value 3.5. In this state, no actual closing of the aperture is made even when the aperture setting device sets the aperture value at 2.8, and the photographing is made at the open F value of the lens unit, i.e. at the aperture value of 3.5. It is thus possible to obtain the optimum exposure condition. This applies, needless to say, to the case where the aperture values corresponding to the ranks are, for instance, 2.0, 3.5, 5.6 and 11 and where the lens unit used has an open F value of 4.0, irrespective of whether the aperture value corresponding to the ranked brightness information is 2.0 or 3.5.

The decoder circuit DEC adapted to perform the described operation can easily be formed of a switching circuit adapted to switch the destination of the output from the digital operation unit DO, a decoder circuit which makes the operation of the opening light measuring mode and a decoder circuit which makes the operation of the closing light measuring mode.

The signal from the oscillation circuit OSC is demultiplied in the frequency dividing circuit FD and is delivered to the main control circuit CC and the shutter control circuit SC as the time signal, to permit the main control circuit CC to make the start and reset of various circuits heretobefore described and to permit the shutter control circuit SC to determine the shutter speed in accordance with the signal coming from the decoder circuit DEC.

This main control circuit CC can have, for example, a construction as shown in FIG. 2 of Japanese Patent Laid-open Publication No. 20,724/1979, while the shutter control circuit SC may be constituted by a counter circuit and a digital comparator circuit.

Symbols $\gamma_1$ and $\gamma_2$ represent solenoids for starting the leading screen and trailing screen, respectively, while the symbol $\alpha$ represents a solenoid for raising the mirror and for releasing the charge retainer hook 1 shown in FIG. 2. Symbols $S_1$, $S_2$ and WE represent signals which are received by the main control circuit CC. More specifically, the signal $S_1$ is produced in connection with the operation of a light measuring switch which is not shown, while the signal $S_2$ is produced in connection with the operation of a release switch which is not shown. The signal WE is produced in accordance with the completion of the winding operation.

In the described embodiment, as the releasing operation is made, the light measuring switch operates to put the light measuring circuit PA into operation, so that the main control circuit CC receives the signal $S_1$ to start to operate. Then, the release switch operates to supply the signal $S_2$ to the main control circuit CC. Upon receipt of the signal $S_2$, the main control circuit CC delivers the start signal to the analog-digital converter circuit ADC, digital operation unit DO, decoder circuit DEC and the shutter control circuit SC to turn them operative. In consequence, as stated before, the analog-digital conversion circuit ADC starts to convert the information from the light measuring circuit PA into digital signal and to deliver the latter to the digital operation unit DO. The digital operation unit DO then performs an arithmetic operation with this digital signal together with the informations given by the film sensitivity setting digital switch SD and the open F value setting digital switch FoD to obtain a digital light value. This digital light value is delivered to the decoder circuit DEC which in turn performs the ranking of the digital light value and delivers signals to the aperture determination circuit AC, display circuit DC, shutter control circuit SC and the decoder circuit DCF. The signal delivered to the shutter control circuit SC of the decoder circuit DEC is the shutter speed signal obtained in the opening light measuring mode, when the aperture value corresponding to the rank is greater than the open F value of the lens, whereas, when the open F value of the lens is greater than the aperture value corresponding to the rank, the signal is the shutter speed signal obtained in the closing light measuring mode. At such a timing that the signals of the decoder circuit DEC or the like are stabilized, the main control circuit CC sends set signals to the analog-digital conversion circuit ADC, digital operation unit DO and the decoder circuit ADC to make the analog-digital converter circuit ADC, digital operation unit DO and the decoder circuit DEC hold their outputs and, at the same time, delivers a signal also to the aperture determination circuit AC to selectively energize the solenoids $\beta_1$ and $\beta_2$ to deliver the aperture value corresponding to the rank. Subsequently, the main control circuit CC energizes the solenoid $\alpha$ to effect the rise of the mirror and the release of the charge retainer hook 1 as shown in FIG. 2. Furthermore, the main control circuit CC sends a signal to the shutter control circuit SC at a timing at which the rise of the mirror and the setting of the aperture are completed, so that the shutter control circuit energizes the solenoid $\gamma_1$ to make the leading screen to run and then energizes the solenoid $\gamma_2$ to make the trailing screen run. The time interval between the running of the leading screen and the trailing screen is determined by a counter adapted to count the time signal from the frequency dividing circuit FD, and the energization of the solenoid $\gamma_2$, i.e. the running of the trailing screen, is made when the counted time length has come equal to the signal from the decoder circuit DEC. The shutter speed determined by the time interval between the running of two screens is the optimum one corresponding to the actual aperture value and the brightness of the object.

It is thus possible to obtain optimum exposure condition always irrespective of the change of the open F value due to the change of the lens unit. Meanwhile, the display control circuit DC receives a start signal to turn to operation at a suitable timing after the start of operation of the main control circuit CC and the commencement of running of the leading screen to make a display in accordance with the display signal from the decoder circuit DEC.

After the completion of the photographing, the winding device which is not shown starts to operate to effect winding of the film and charging of the mirror, aperture device and the shutter. As the winding up operation is completed, the main control circuit CC receives a signal WE so that the latter produces signals for resetting the analog-digital converter circuit ADC and other circuits. A series of photographing operation is thus completed so that the exposure control device of the invention is completely reset to the starting condition.

Although the exposure control is made digitally in the described embodiment, this is not exclusive and the setting of the aperture value and the determination of the shutter speed may be made in accordance with the analog information. Also, the invention is applicable to cameras other than the single-lens reflex camera and also to the single-lens reflex camera of the type in which the TTL light measurement is effected after the rise of the mirror. In the latter case, it is necessary to raise the mirror in advance to the setting of the aperture. To this end, needless to say, it is arranged such that the rise of the mirror and the release of the change retainer hook are made separately.

The output from the light measuring circuit PA is converted by the analog-digital converter circuit ADC into a digital object brightness information which is delivered to the digital operation unit OD together with the digital film sensitivity information coming from the film sensitivity setting digital switch SD. The digital operation unit DO then consists the object brightness information with the film sensitivity to produce a digital brightness information which is delivered to the decoder circuit DEC. The decoder circuit DEC makes the ranking of the digital brightness information and delivers an aperture value signal representing the aperture value corresponding to the rank of the brightness to the aperture determination circuit AC. Also, it delivers to the shutter control circuit SC a shutter speed signal which correspond to the rank, i.e. the aperture value and the digital brightness information. In accordance with these signals, the aperture determination circuit AC and the shutter control circuit SC determine the aperture value and the shutter speed, respectively, for the photographing. The timings of operation of the circuits and the resetting of the same are controlled mainly by the main control circuit CC.

The basic operation of the programed exposure control has been described. In the embodiments shown in FIGS. 4 to 7, optimum exposure condition is always obtained even when the F value is changed due to the change of the lens unit, as will be understood from the following description.

Figure 4:
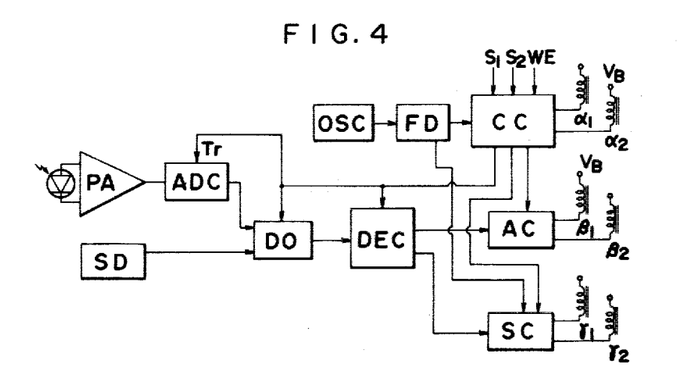
FIG. 4 is a block circuit diagram of an exposure control device in which a TTL light measurement is performed through the medium of a mirror.

Referring first to the exposure control device shown in FIG. 4, as the release operation is made, a light measuring switch (not shown) is operated so that the light measuring circuit PA comes to take the state capable of delivering TTL light measuring analog information. At the same time, the main control circuit CC receives the signal $S_1$ and is put into operation. Then, as a result of the release operation, the release switch (not shown) is turned on so tht the main control circuit CC receives the signal $S_2$. The main control circuit CC delivers, upon receipt of the signal $S_2$, a signal to the solenoid $\beta_1$ to actuate the latter and then actuates the solenoid $\alpha_1$. In consequence, the aperture setting device shown in FIG. 3 acts to set the aperture at a constant aperture value which substantially eliminates the influence of difference of the open F value of the lens unit. This operation is made in a manner described hereinunder.

As the solenoid $\beta_1$ operates, the open side aperture value hook 4 is biased in the counter-clockwise direction and, as the solenoid $\alpha_1$ is actuated, the charge retainer hook 3 is rotated in the counter-clockwise direction overcoming the force of the spring to be disengaged from the setting bar 2. The aperture setting bar 2 thus released is moved to the right by the pulling force exerted by the spring 7. Then, as the aperture setting bar is moved to the right, the hook 4 is rotated counter-clockwise into engagement with the open side aperture value projection 22 provided on the setting bar 2, so that the aperture setting bar 2 is retained at a position where it provides the open-side aperture value. The aperture blade driving lever 1 is always biased by a spring (not shown) into contact with the operation arm 21 of the aperture setting bar 2 in the state that the lens unit is mounted on the camera body, so as to perfectly cooperate with the aperture setting bar 2 in changing and controlling the aperture opening.

In the state that the aperture setting bar 2 retained at the position for providing the open-side aperture value, the aperture control device provides, in the camera which can be used with changeable lens units having open F values of 1.4, 2.0, 2.8 and so forth for example, an aperture value of 2.8. In the case where the camera is operable with lens units having open F values of, for example, 2.0, 2.8, 3.5 and 4.0, the influence of difference of open F value of the lens units on the TTL light measuring information can be eliminated by setting the aperture value at 4.0. This aperture value appears to be too large for the lens units having open F values of 2.0 and 2.8. The effect of photographing with a shutter speed which is obtained by regarding the TTL light measuring information for the lens unit having open F value of 4.0 as being of aperture value 3.5 has no substantial degradation as compared with the photographing which is made under the optimum exposure condition with aperture value of 4.0. Therefore, in this case, the open-side aperture value may be selected to be 3.5. In the present invention, the feature of "aperture is set beforehand at such a constant aperture value which can substantially eliminates the influence of difference of open F value of the lens unit " is provided for this reason.

It will be seen that, according to the invention, the influence of difference of the open F value of the lens on the TTL light measurement is avoided.

The main control circuit CC delivers, after energization of the solenoid $\alpha_1$, a start signal Tr to the analog-digital conversion circuit ADC, digital operator DO, decoder circuit DEC and the shutter control circuit SC to make them operative. As a result, the analog-digital converter circuit ADC, digital operation unit DO and the decoder circuit DEC start to make the operation such as analog-digital conversion, arithmetic operation and ranking of the brightness.

Then, after the output from the decoder circuit DEC is stabilized, provides signals to the analog-digital conversion circuit ADC, digital operation unit DO, decoder circuit DEC and the shutter control circuit SC, to make the analog-digital conversion circuit ADC, digital operation unit DO and the decoder circuit DEC hold their outputs. At the same time, the main control circuit CC delivers a signal also to the aperture determination circuit AC to selectively energize and de-energize the solenoids $\beta_1$ and $\beta_2$ in accordance with the aperture signal coming from the decoder circuit DEC.

Namely, when the brightness is ranked at low rank by the decoder DEC, the solenoids $\beta_1$ and $\beta_2$ are kept continuously in energized and de-energized states, respectively. When the brightness is ranked at medium level, the solenoid $\beta_1$ is de-energized, while $\beta_2$ is energized. Finally, if the brightness is ranked at high rank, the solenoid $\beta_1$ is de-energized and the solenoid $\beta_2$ is kept de-energized.

In consequence, the aperture setting bar 2 of the aperture setting device shown in FIG. 2 keeps the position for providing the open-side aperture value when the brightness is ranked low. When the brightness is ranked at the medium rank, the open-side aperture value hook 4 is disengaged from the open-side aperture value projection 22, and the medium aperture value hook 5 is stopped by the medium aperture value projection 23 upon engagement with the latter. When the brightness is ranked at high rank, the open-side aperture value hook 4 is disengaged and stopped by the maximum aperture value stopper member which provides the maximum aperture value. The aperture value for the photographing is determined in the manner stated above.

The main control circuit CC acts, while the decoder circuit DEC holds its output, the solenoid $\alpha_2$ for raising the mirror to raise the latter.

Meanwhile, the shutter control circuit SC which has received the signal energizes the leading screen solenoid $\gamma_1$ to make the leading screen run at the same timing as the setting of the aperture value. Then, a counter starts to count the time signal derived from a frequency dividing circuit FD which demultiplies the signal from an oscillation circuit OSC. As this time signal has come equal to the shutter speed signal provided by the decoder circuit DEC, the shutter control circuit SC energizes the trailing screen solenoid $\gamma_2$ to make the trailing screen run. The shutter speed is thus determined to provide always the optimum exposure condition irrespective of the open F value of the lens. Namely, this shutter control circuit SC has a construction including the counter circuit, digital comparator and so forth.

After the completion of the photographing, winding up device (not shown) is operated to wind up the film and to charge the mirror, aperture and shutter, and, thereafter, a signal WE is delivered to the main control circuit CC. The main control circuit CC then sends signals to the analog-digital conversion circuit ADC, digital operation unit DO, decoder circuit DEC and the shutter control circuit SC thereby to reset these circuits. As a result, the aperture determination circuit is also reset to complete a series of photographing operation. In this state, the exposure control device resumes the starting condition.

In the described embodiment, the main control circuit CC controls various timings on the basis of time signal derived from a frequency dividing circuit FD. This main control circuit CC can have, for example, a construction as shown in FIG. 2 of Japanese Patent Laid-open Publication No. 20,724/1979.

Figure 6:
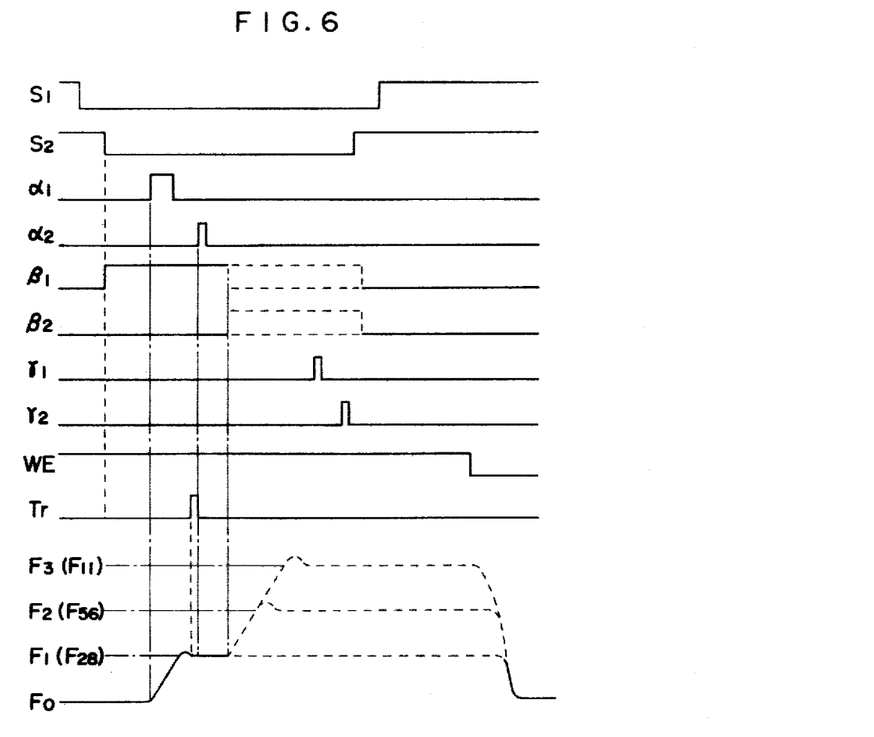
FIG. 6 is a timing chart of the control device shown in FIG. 4.

FIG. 6 shows the timings of various signals and operations of solenoids taking part in the control of the exposure control in the series of photographing operation.

Figure 5:
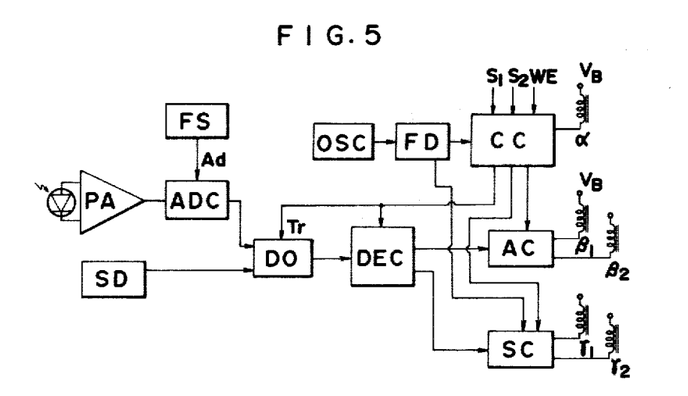
FIG. 5 is a block circuit diagram of an exposure control device in which the TTL light measurement is made while the mirror is raised.

In the exposure control apparatus shown in FIG. 5, the TTL light measurement is made in accordance with the rise of the mirror. As the main control circuit CC actuates the solenoid a, the latter acts to raise the mirror and to release the charge retainer hook 3 of the aperture setting device shown in FIG. 2. Also, the analog-digital conversion circuit ADC is adapted to receive the starting signal AD from the operation detection device FS. Therefore, it is possible to shift the timing of delivery of the start signal Tr from the main control circuit CC to the circuits such as the digital operation unit DO, decoder circuit DEC and the shutter control circuit SC, to such a timing at which the analog-digital conversion circuit ADC completes the analog-digital conversion upon receipt of the start signal AD.

The aperture operation detection device FS may be constituted by a photocoupler adapted to produce an output signal upon receipt of a light which is made to pass as a setting cover 3 of the aperture setting device is moved to the right from the charging position.

Figure 7:
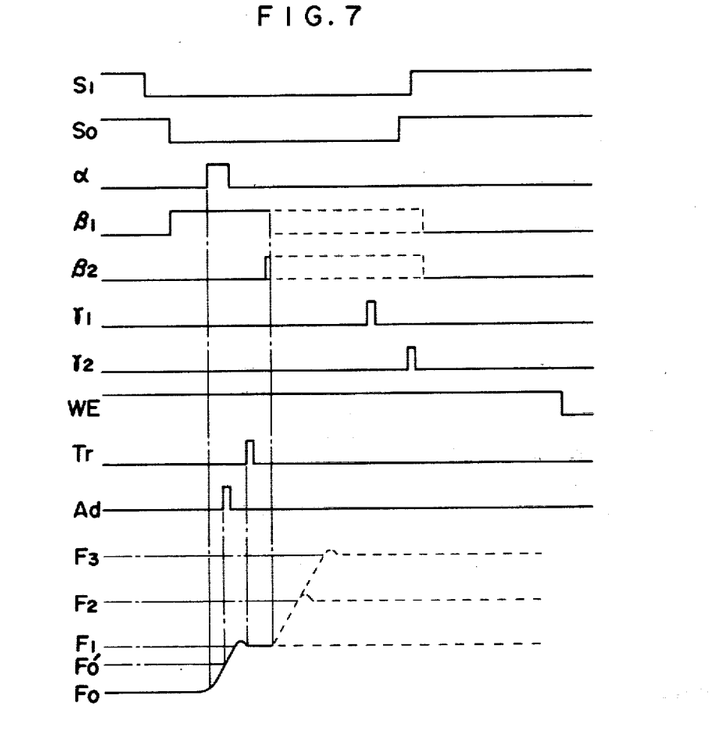
FIG. 7 is a timing chart of the control device shown in FIG. 5.

This embodiment differs from that shown in FIG. 4 only in the points mentioned above, and the aperture control operation is made substantially in the same manner as that of the embodiment shown in FIG. 4. FIG. 7 shows the timing of operation of timing in the operation shown in FIG. 5.

As has been described, in this embodiment, it is not necessary to introduce the open F value information of the lens. In addition, the light measurement is made not in the closing mode. Namely, even when the closing of aperture is made beforehand by the lens unit, the light measurement is made thereafter in the opening mode, so that optimum exposure condition is obtained always without necessitating previous setting of the shutter speed and aperture value. This also offers an advantage that the construction of the device is simplified.

It is also to be noted that the device of the invention can adopt an analog control, although the described embodiments relies upon a digital control.

What is claimed is:

1. A programmed exposure control device for changeable lens type camera of the type in which the object brightness information is corrected in accordance with other exposure informations including the open F value and the corrected brightness information is ranked to permit the determination of the aperture value in accordance with the rank in a stepped manner and the determination of the shutter speed in accordance with the rank and the brightness information, characterized in that said device is further including at least one comparison circuit to compare whether the open F value is greater than the smallest aperture value corresponding to the rank or not and is so constructed as to provide, when the open F value of the lens to be used is greater than the smallest aperture value corresponding to the rank, a shutter speed signal representing a shutter time length is determined which is longer than the shutter time length corresponding to the rank which provides the open-side aperture value closest to the open F value of the lens and to the brightness information, by a time length corresponding to a predetermined light value.

2. A programmed exposure control device for changeable lens type camera of the type in which the object brightness information obtained through a TTL light measurement is corrected in accordance with other exposure informations including the open F value of the lens and the brightness information thus obtained is ranked to permit the determination of the aperture value in accordance with the rank in a stepped manner and the determination of the shutter speed in accordance with the rank and on the basis of the brightness information, characterizes in that, when the aperture value determined by the rank is smaller than the open F value of the lens to be used, the actual closing of aperture is not made and the shutter speed is determined in accordance with the brightness information which has not been subjected to the correction by the open F value of the lens.

3. A programmed exposure control device for changeable lens type camera characterized in that the aperture is beforehand set at a constant aperture value which can substantially eliminate the influence of difference of the open F value of the lens, and that the aperture value for the actual photographing is determined in accordance with the TTL light measurement information at the first-mentioned aperture value, while the shutter speed is determined in accordance with the thus determined aperture value.

* * * * *